United States Patent [19]

Khmelnitsky et al.

[11] Patent Number: 4,743,146
[45] Date of Patent: May 10, 1988

[54] TOOL FOR CUTTING EXTERNAL THREADS

[75] Inventors: Naum L. Khmelnitsky; Albert M. Boyarunas; Anatoly V. Kyzgzmin; Vitaly F. Drozhin; Dmitry E. Belyavsky; Gennady V. Grinvald; Viktor P. Kirienko, all of Kharkov, U.S.S.R.

[73] Assignee: Kharkovsky Filial Golovnogo Spetsialnogo Proizvodstvennogo Konstruktorsko-Tekhnologicheskogo Bjuro Po Ratsionalnomu Primeneniju Rezhuschego Instrumenta "Orgpriminstrument", Kharkov, U.S.S.R.

[21] Appl. No.: 902,710

[22] Filed: Sep. 2, 1986

[51] Int. Cl.[4] ............................................. B23G 5/04
[52] U.S. Cl. .................................. 408/221; 10/120.5 R
[58] Field of Search .................. 408/221, 222, 224; 409/65, 73; 10/111, 120, 120.5 R, 121, 123 R, 123 P, 123 S

[56] References Cited

U.S. PATENT DOCUMENTS 1,262,516  4/1918  Klatt ..................................... 10/120
2,513,864  7/1950  Haycock et al. ..................... 408/221

FOREIGN PATENT DOCUMENTS

33172   1/1910  Sweden ................................. 10/111
15659   7/1909  United Kingdom ................. 10/111
199644  8/1967  U.S.S.R. .

Primary Examiner—Z. R. Bilinsky
Attorney, Agent, or Firm—Fleit, Jacobson, Cohn & Price

[57] ABSTRACT

A tool for cutting external threads in the form of a round die having a housing with thread chasers arranged at its end and extending toward the interior of the housing. The housing has the form of an annulus with an inside diameter greater than the diameter of thread chaser blades by the height of the thread chaser.

6 Claims, 6 Drawing Sheets

TOOL FOR CUTTING EXTERNAL THREADS

This invention relates generally to the art of metal working, and more particularly to tools for cutting external threads of the die type.

It is known that within one and the same nominal thread diameter and pitch the thread parameters may differ depending on the allowance and fit, or on the intention of a threaded joint (viz., a thread for operation at high or low temperatures, a thread which is to be electroplated, etc.). Each such thread is normally cut by a separate thread cutting tool, or a complicated screw-cutting head provided with means for accurate readjustment.

Readjustment to a wide range of thread diameters is ensured only by structurally overcomplicated screw-cutting heads.

It is further known that uniform load distribution between thread turns can be guaranteed by a double-pitch thread of a variable thread turn thickness and variable major thread diameter. Such a thread can be cut by using a rather complicated manufacturing technique—separate machining of each flank or side of the thread profile.

Known in the art are thread cutting dies end faces of which are provided with recesses and have thread chasers, the recesses of one end face being displaced relative to the recesses of the other end face by half of angular pitch (cf. e.g., USSR Inventor's Certificate No. 645,784; Int. Cl. B 23 G 5/04, published 1979). A die of this type machines as a continuous zig-zag thread cutting ring having a tendency to wedge, jam and sieze in the rod workpiece being machined.

Also known in the art is a thread cutting die as described in USSR Inventor's Certificate No. 199,644; Int. Cl. B 23 G 5/04, published 1966. End faces of this die have recesses with a rectilinear front face forming cutting edges at the intersection with the central thread cutting hole.

The dies of this type, however, are inherently disadvantageous due to complexities associated with chip removal, rigid connection of the geometrical parameters, and structural difficulties, since the recesses can only be made by milling.

Such dies (or a group of such dies) fail to ensure readjustments for cutting a thread of a different diameter, or a thread intended for a different use. The dies of this type further cannot ensure uniform distribution of loads between thread turns of threaded joints, and fail to solve other problems associated with the need to expand thread cutting capabilities.

It is therefore an object of the present invention to provide a tool for cutting external threads of the round die type, which would be so constructed as to ensure easy manufacture, provide more favourable thread cutting conditions, and expand the range of tool applications.

The object of the invention is attained by that in a tool for cutting external threads fashioned as a round die having a housing with end thread chasers, according to the invention, the thread chasers extend toward the interior of the housing, whereas the housing has the form of an annulus the inner diameter of which is greater than the diameter of thread blades of the chasers by the height of the chaser.

This structural arrangement of the proposed tool provides better cutting conditions through facilitating chip removal and disposal. Another advantage is that through obviating traditional limitations imposed by size interrelationship, the aforedescribed arrangement makes it possible to select the tool geometry (such as die stock thickness, number of chasers, their width, etc.) for the optimum thread cutting conditions, which also simplifies the tool per se.

Preferably, the thread chasers have the form of arcuate elements with a thickness not exceeding the thickness of the housing, these arcuate elements being secured to an end face of the housing in a cantilever fashion by their portions inner and outer surfaces of which coincide with the inner and outer surfaces of the housing, whereas the parts of the thread chambers extending toward the interior of the housing are formed at least by one end of each arcuate element.

Such a construction of the thread chasers is easier to materialize allowing to form the housing and chasers of the die by using powder metallurgy, or by plastic deformation of a tubular workpiece.

Alternatively, the thread chasers are fashioned as sector elements.

This simplifies the tool manufacture, making it possible to form the housing and die chasers by stamping a sheet steel workpiece.

Desirably, the tool is provided with additional thread chasers interposed between the main thread chasers so that their end faces substantially coincide with the end faces of the housing.

Advisably, the thread chasers are divided into groups so that the chasers of one group are interposed between the chasers of another group, and are offset relative to each other axially of the housing.

This enables to improve cutting conditions through distributing functions between the chasers offset differently relative to the housing of the tool.

Alternatively, one group of chasers have cutting thread blades, whereas the other group of chasers have calibrating thread blades.

This ensures optimized geometrical parameters of the tool elements (such as the rake angle) providing that they are most favourable for the group of chasers to perform their function.

It is also possible to make the cutting thread blades full-profile variable-pitch, the thread pitch being greater at the starting thread turns of the thread blades and progressively diminishing to the nominal pitch at the last turns of the thread blades.

This enables to cut threads according to the generation scheme.

Alternatively, the thread chasers of different groups can be arranged at the opposite ends of the housing.

This improves conditions for centering the tool on the workpiece to be machined.

Preferably, the proposed tool is provided with at least one additional annular housing arranged coaxially with the main housing, this additional annular housing having end thread chasers disposed between thread chasers of the main housing and having a diameter of thread blades equal to the thread blade diameter of the main housing.

This provides new thread cutting capabilities through enabling thread cutting by chasers secured on different housings.

Alternatively, the additional annular housing has an outer diameter substantially equal to the inner diameter of the main housing, the additional housing being accommodated coaxially inside the main housing.

Such an arrangement makes it possible to design a tool in which one of the housing is accommodated inside another housing with thread cutters carried by these housings alternating.

Desirably, the main and additional housings are capable of axial and angular displacement relative to each other.

This allows by settable angular and axial displacement of the housings to cut by the same tool threads, which differ in fit and designation.

Alternatively, the main and additional housings are interconnected through a resilient element.

This ensures an improvement in the dimensional stability of the tool through automatically maintaining the desired pitch diameter.

Preferably, the main and additional housings of the proposed tool are capable of relative axial displacement, the thread blades of the thread chasers of the main and additional housings differing in pitch.

Such an arrangement provides for cutting a double-pitch thread having a variable major diameter enabling to more uniformly distribute loads exerted on the thread turns of a threaded joint.

Alternatively, the proposed tool is provided with at least two additional housings insertable one inside the other and into the main housing to be capable of relative rotation, and arranged so that the inner surface of each such housing is eccentric relative to the outer surface of this housing, the number of thread chasers being equal to the number of housings, each housing having one such thread chaser, the thread blades of all the thread chasers being arranged on one helical line.

The above arrangement ensures readjustment of the tool for cutting threads of different diameters.

Advisably, in the proposed thread cutting tool the thread blades of thread chasers of the main and additional housings are axially offset relative to each other by a magnitude determined from the following relationship:

$$S = P(n + \tfrac{1}{2}),$$

where
S is the magnitude of the axial offset;
P is the thread pitch; and
n is the number of thread turns necessary for tool self-tightening.

This feature of the tool according to the present invention ensures obtaining a cylindrical surface through cutting away thread turns cut by the chasers attached to the main housing by thread turns cut by the chasers secured on the additional housing.

The invention will now be described in greater detail with reference to various specific embodiments thereof taken in conjunction with the accompanying drawings, in which.

Figures 1, 2, 3:
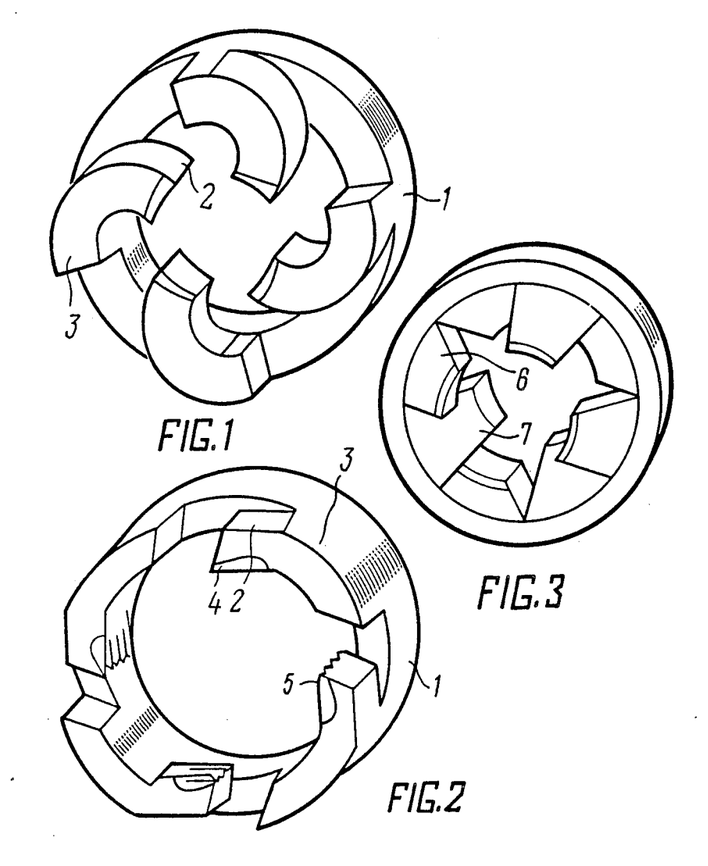
FIG. 1 is an axonometric view of a tool for cutting external threads according to the invention.
FIG. 2 shows a tool for cutting external threads with tangentially arranged chasers.
FIG. 3 is a view of a thread cutting tool having chasers in the form of sector elements.

With reference to FIG. 1 of the accompanying drawings, there is shown a tool for cutting external threads embodying the present invention in the form of a round thread-cutting die with radial thread chasers. The tool according to the invention comprises a housing 1 fashioned as an annulus and having thread chasers 2 arranged at the end face of the housing 1 and displaced relative to this housing 1. The thread diameter of the chasers 2 is less than the inner diameter of the annular housing 1 by the height of the chaser 2.

The thread chasers 2 have the form of arcuate elements having a thickness not exceeding the thickness of the housing. The chasers 2 are secured in a cantilever fashion to the end face of the housing 1 by their portions 3 having the inner and outer surfaces coinciding with the inner and outer cylindrical surfaces of the housing 1.

The tool embodying the present invention is so constructed as to have geometrical parameters determined exclusively by the most favourable conditions of cutting, thereby dispensing with conventional limitations imposed by the interdependent dimensions of the prior art thread-cutting dies. As a consequence, the number of thread chasers, their height, width, and arrangement, as well as the inner and outer diameters of the housing, do not depend on the thread to be cut, and are selected from purely structural considerations. This advantage provides new design capabilities to be described in greater detail hereinafter.

When cutting a thread by such a tool, favourable conditions for chip removal are ensured by virtue of the fact that cavities receiving the chip are formed due to projection of the thread chasers to the interior of the tool housing. Thread cutting conditions are also optimized thanks to the arbitrary choice of the number of chasers, their width, height, and position.

With reference to FIG. 2, a modified form of the proposed thread-cutting tool is characterized by tangential arrangement of the chasers 2 relative to the workpiece being machined. Thread blades 4 of the chasers 2 in this tool are provided at the inner side surface of the chasers 2. The width of such a thread chaser 2 is substantially equal to the width of the cylindrical land indicated at 5 in FIG. 2. The tangential arrangement of the chasers 2 impart high rigidity thereto.

The tools described with reference to FIGS. 1 and 2 can be fabricated from a tubular workpiece by stamping, or by using powder metallurgy techniques.

Referring now to FIG. 3, thread chasers 6 and 7 are fashioned as sector elements with the chasers 6 interposed between the chasers 7 and axially offset relative to the latter.

Figure 4:
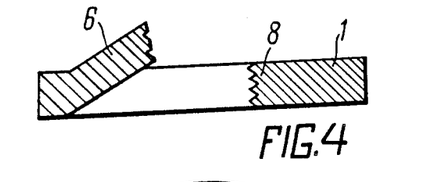
FIG. 4 is a side sectional view of a tool provided with additional chasers end faces of which coincide with the end faces of the housing.
Figure 5:
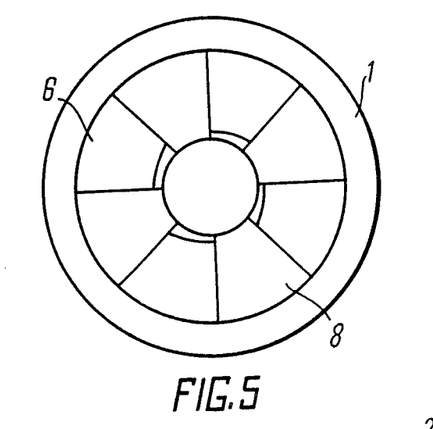
FIG. 5 is a top plan view of the tool illustrated in FIG. 4.

FIGS. 4 and 5 illustrate a modification of the thread-cutting tool in which the chasers 6 are axially offset relative the housing and disposed between additional chasers 8, end faces of which are made at one level with the end faces of the housing 1.

Separation of the thread chasers into groups is done both by varying the magnitude and direction of their axial displacement. Such groups of chasers may have different functions in the proposed tool. For example, with reference to the tool represented in FIG. 4, the chasers 6 accommodate cutting thread blades, whereas the chasers 8 are provided with calibrating thread blades.

Figure 6:
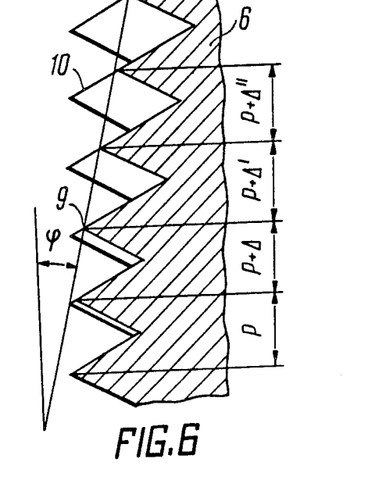
FIG. 6 is a sectional view of a full-profile variable-pitch thread cutting blade.

Since for the optimum cutting conditions the geometrical parameters of the cutting and calibrating thread blades should differ, the cutting blades 6 have a more pronounced rake angle and less serrations than the calibrating blades 8. With reference to FIG. 6, the chasers 6 have full-profile variable-pitch thread blades 9, the increased pitch of the front thread-cutting turns $(P+\Delta'')$ progressively diminishing to the nominal pitch value P at the rear thread turns thereof.

For the sake of comparison, FIG. 6 also illustrates the nominal thread profile 10 of the thread-cutting blade. Because the length of the line of contact between the thread cutting tool and workpiece is determined by the space between the groups of chasers most offset axially relative to each other, the amount and direction of such an offset make it possible to control the degree of centering of the thread cutting tool on the workpiece.

During thread cutting this tool exhibits the degree of centering required for a given configuration of the workpiece being machined. Assuming that the longitudinal axis of the workpiece is straight, the tool tends to centrally align more easily due to that the groups of thread chasers are offset to both sides of the tool housing ends. The cutting blades remove most of the thread metal, whereas the calibrating blades act to protect and calibrate the thread. The parameters of the cutting and calibrating blades designated to perform different functions provide optimum conditions for forming a thread on the workpiece.

The full-profile thread cutting blade with variable-pitch cutting edges allows to cut a thread according to a generation procedure. This results in reduced lip angle $\phi$, whereas allowance is distributed among a greater number of threads without markedly increasing the amount of friction between the tool and workpiece. The tools represented in FIGS. 3, 4, 5 and 6 can be fabricated by sheet steel stamping.

The geometry of the housing (particularly, the inner and outer diameters thereof) independent from the diameter of the thread blades makes it possible to provide the proposed tool with several housings arranged coaxially one inside another. Therewith, each of the housing accommodates its own chasers of equal thread diameter. The chasers disposed on an additional housing (or housings) occupy a space between the chasers of the main housing.

Figures 7, 8:
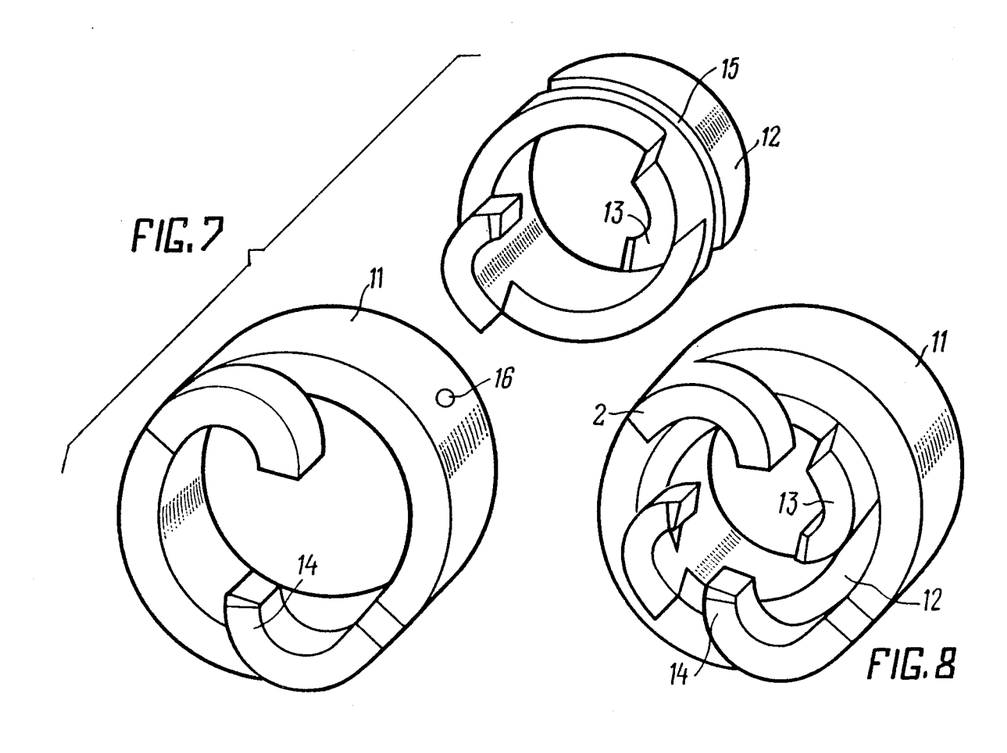
FIG. 7 is an axonometric view of the arrangement of chasers at two housings, where the inside diameter of the main housing is equal to the outside diameter of the additional housing.
FIG. 8 shows the tool represented in FIG. 7 in an assembled state.
Figure 9:
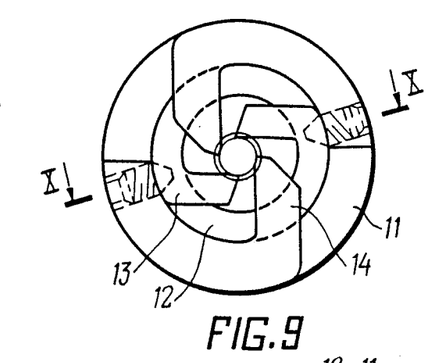
FIG. 9 is a top plan view of a thread cutting tool in which the additional housing is capable of angular and axial adjustable displacement relative to the main housing.
Figure 10:
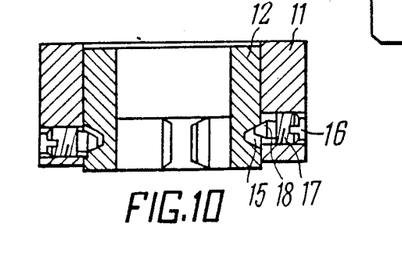
FIG. 10 is a section taken along the line X—X in FIG. 9.

FIG. 7 represents two modified forms of the proposed tool both of which are substantially identical to the tool shown in FIG. 1. The main annular housing 11 has an inside diameter equal to the outside diameter of the additional annular housing 12. FIGS. 8, 9 and 10 illustrate these tools assembled in an integrated tool by placing the additional annular housing 12 inside the main annular housing 11 and arranging chasers 13 secured on the additional housing between chasers 14 of the main housing.

The outer surface of the additional housing 12 has an annular groove 15 (FIGS. 7 and 10) of trapezoidal or triangular cross-section, whereas the main housing 11 is provided with threaded holes 16 axially offset relative to each other so that screws 17 (FIG. 10) engaging with these holes 16 are in contact by their tapers 18 with the opposite side faces of the groove 15.

During preparation of the tool for operation the additional housing 12 is inserted into the main housing 11, after which the tool is screwed onto a male gauge or master screw corresponding to a thread to be made. By rotating the additional housing 12 and displacing it axially relative to the main housing 11 it is possible by means of the screws 17 to adjust the tool to the thread to be made, and thereafter the mutual position of the housings is locked by the screws 17.

Thanks to that the groove 15 is annular, and the tapers 18 of the screws 17 are in contact with the opposite side faces of this groove 15, the additional housing 12 is capable of assuming any axial position and being turned at any angle relative to the main housing 11, even to the point of contact of the chasers 14 with the chasers 13.

This in turn enables practically any predetermined misalignment in the geometrical positions of the thread blades of the chasers 14 and 13.

When cutting a thread by this tool, due to the misalignment of the thread blades during adjusting the tool, the chasers secured at one housing act to undercut the thread profile formed by the chasers secured at the other housing, making it possible to adjust the pitch diameter of the thread being machined. Due to the arrangement of the chasers of one housing between the chasers of the other housing, they work in parallel, which prevents insufficient thread cut or uncorrected thread portions. When switching to making threads having other tolerances and fits, or when the blades wear out, the tool is readjusted in the aforedescribed manner.

Figures 11, 12, 18, 19, 20, 21:
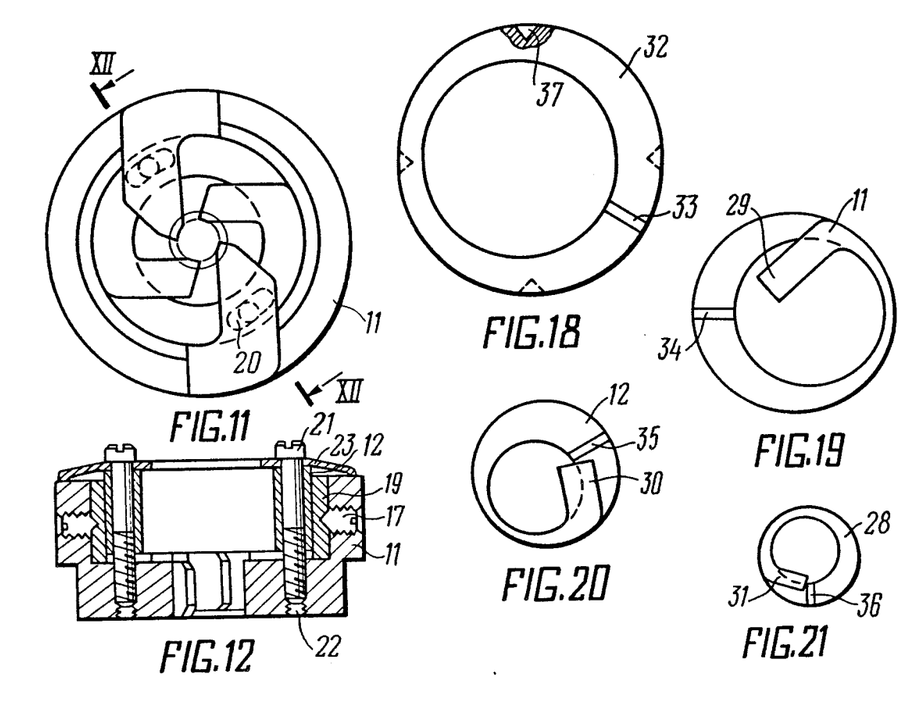
FIG. 11 is a top plan view of a tool modification, where the main and additional housings are connected through a resilient element.
FIG. 12 is a section taken along the line XII—XII in FIG. 11.
FIG. 18 is a view of a shell of the tool shown in FIG. 16.
FIG. 19 is a view of the main housing of the tool shown in FIG. 16.
FIG. 20 is a view of the additional housing of the tool shown in FIG. 16.
FIG. 21 is a view of a second additional housing of the tool shown in FIG. 16.

An alternative modification of the proposed tool is possible as illustrated in FIGS. 11 and 12, where automatic readjustment is possible after the blades wear out.

This tool is additionally provided with a ring member 19 interposed between the main and additional housings 11 and 12, respectively.

An annular groove is provided at the outer surface of the ring member 19, the ring member 19 being connected to the additional housing 12 such as by means of a sliding key (not shown). The additional housing 12 is provided with grooves 20 (FIG. 11) arranged concentrically relative to the axis of the tool, screws 21 (FIG. 12) extending through these grooves 20 to engage with threaded holes 22 of the main housing 11. The heads of the screws 21 are brought in contact with a disk spring 23.

In order to adjust such a tool, it is necessary to loosen the screws 17, and by turning the housing 12 relative to the housing 11 the tool is adjusted by a male gauge to a desired thread size. After this, having tightened the screws 17, the angular relative position of the housings 11 and 12 is locked. By turning the screws 21 the spring 23 is compressed to a predetermined force counteracting the axial displacement of the additional housing 12 relative to the main housing 11.

When cutting a thread by this tool, subsequent to wear of the thread blades, an axial component of the force of cutting grows, and the housing 12, while overcoming the resistance of the disk spring 23, is caused to move axially relative to the housing 11. This results in a more pronounced misalignment in the thread blades of the chasers 13 and 14 and more extensive thread profile cutting to entail reduction in pitch diameter to a predetermined value.

Thread blade misalignment makes it possible to control the pitch diameter within the desired nominal value. By virtue of this advantage one such tool is capable of cutting threads with different fits and for different designations to result in less thread cutting tools and more efficient tool operation. The possibility of reducing the pitch diameter of the thread being cut after the chaser blades wear improves the dimensional stability of the tool.

Figure 13:
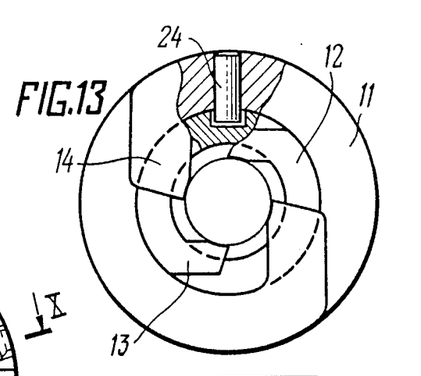
FIG. 13 is a top plan view of a tool in which the additional housing is capable of axial displacement relative to the main housing.
Figure 14:
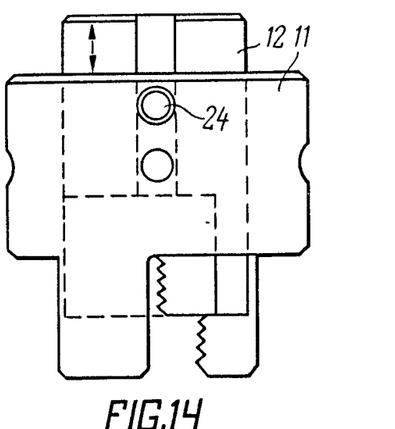
FIG. 14 is a side elevation of the tool represented in FIG. 13.

In a modified tool according to the invention shown in FIGS. 13 and 14 the main and additional housings 11 and 12, respectively, are capable of relative axial displacement without rotation thanks to a sliding key 24. The thread pitch at the chasers 14 (FIG. 13) of the main housing 11 differs from the thread pitch of the chasers 13 of the additional housing 12, and is related thereto by a system of equations:

$$P_1 = P(1 - tg\omega/ctg\alpha)$$

$$P_2 = 2P - P_1,$$

where

P is the pitch of the thread being cut;
$P_1$ is the thread pitch of the chasers of the main housing;
$P_2$ is the thread pitch of the chasers of the additional housing;
$\omega$ is half taper angle of the major diameter of the thread being cut; and
$\alpha$ is the thread profile angle of the thread chasers.

When cutting a thread by such a tool, due to a difference in the thread pitch of the chaser blades, the speed of axial movement of the chasers 12 and 13, of the main and additional housings will be different.

Figure 15:
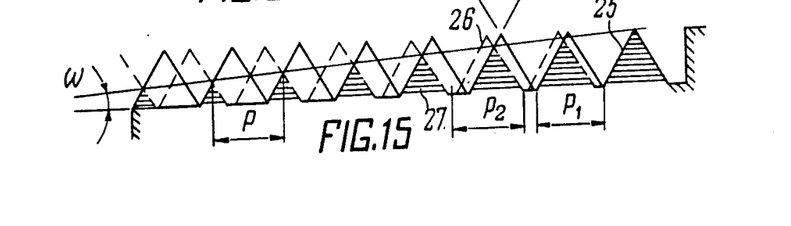
FIG. 15 is a diagrammatic illustration of how a double-pitch thread with variable major diameter is cut, the resultant thread being shown hatched.

Therefore, in a thread 25 (FIG. 15) cut by the chasers 12 the chasers 13 cutting a thread 26 will cut one flank of the thread side profile. The amount of allowance being removed will continuously vary, whereby a resulting thread 27 (hatched in FIG. 15) will be formed having a variable major diameter. One flank of the resultant thread 27 is cut by the chasers, which have a thread pitch substantially different from the pitch of the chasers cutting the other flank or side of the thread profile. The direction of change in the major diameter of the resultant thread (viz., its tendency to increase or diminish) is determined by the initial axial setting of the chasers 12 relative to the chasers 13, whereas the taper angle of the major diameter (angle $\omega$) is determined by the relationship between thread pitch of the chasers 12 and 13.

Such a tool makes it possible, without the employment of special equipment or readjusting the equipment in use, to obtain a double-pitch thread having a variable major diameter and variable thread turn thickness. Cutting threads of this type on, for example, bolts would ensure, after they are mated with conventional nuts, threaded joints with uniform distribution of loads between the thread turns.

Figure 16:
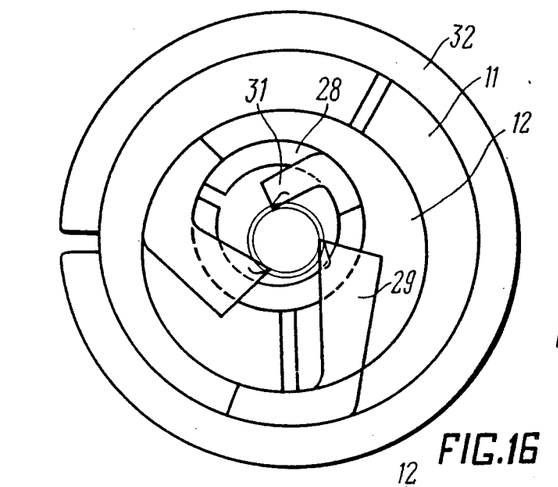
FIG. 16 is a top plan view of a tool capable of readjustment for cutting threads of various diameters.
Figure 17:
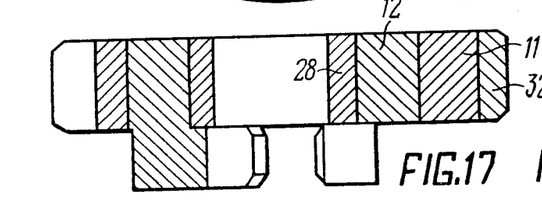
FIG. 17 is a side sectional view of the tool shown in FIG. 16.

Referring now to FIGS. 16 and 17, there is shown a tool which includes, along with the main housing 11 and additional housing 12, a second additional housing 28. Each of the housings carries one end chaser. The main housing 11 carries a chaser 29, the first additional housing 28 carries a chaser 30, whereas the second additional housing 28 carries a chaser 31. The tool is provided with a shell 32. The inner surfaces of the shell 32, main housing 11, and additional housings 12 and 28 have a certain amount of eccentricity relative to their outer surfaces. The second additional housing 28 occupies a space inside the additional housing 12, which is secured in the main housing 11 in turn accommodated inside the shell 32.

Separate elements of the tool are represented in the accompanying drawings. FIG. 18 shows the shell 32. FIG. 19 shows the main housing 11 with the thread chaser 29. FIG. 20 shows the additional housing 12 with the chaser 30. FIG. 21 illustrates the second additional housing 28 with the thread chaser 31. Splits 33, 34, 35 and 36 are made on the shell 32 and housings 11, 12 and 28, whereas the outer surface of the shell 32 is provided with a hole 37 to receive clamping screws of a die stock (not shown).

The tool is adjusted for making a thread of desired diameter by a male gauge or master screw using a device providing accurate centering of the gauge relative to the outer surface of the shell 32. Because the inner surfaces of the shell and each of the housings are eccentrical with respect to their outer surfaces, turning the housings acts to change the radial position of the chasers, which ensures their adjustment to a desired diameter of the thread to be made. Subsequent to adjusting the blades of the chasers 29, 30 and 31 to the gauge thread and after their equidistant angular spacing, the screws of the die stock are engaged with the hole 37. Therewith, the shell and housings are compressed thanks to the provision of the slots 33, 34, 35 and 36, and locked relative to one another.

A thread is cut by such a tool in a manner substantially similar to thread cutting by conventional tools.

The use of the proposed tool offers substantial economic advantages thanks to its structural simplicity and ease of manufacture. The tool has no complex contoured surfaces—both inner and outer surfaces of all the housings are cylindrical and amenable to machining by multipurpose coventional equipment. The thread cutting chasers and eccentric surfaces of the housing make a single unit, which enables to dispense with a kinematic linkage between the eccentrics and thread cutting elements.

Another advantage of the proposed tool is that while being structurally simple it can be readjusted for cutting a wide range of thread diameters.

Figures 22, 23:
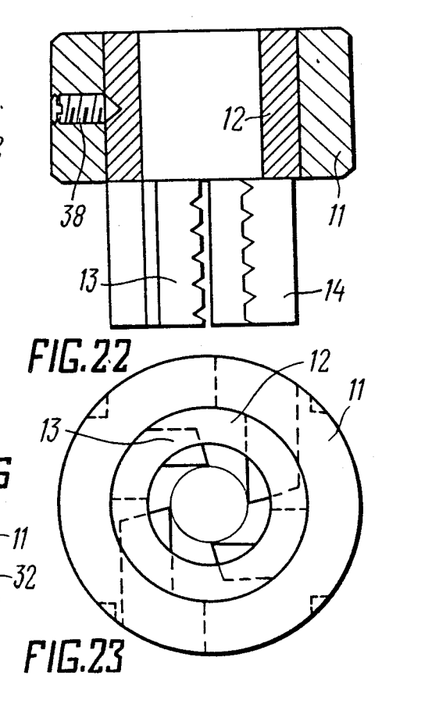
FIG. 22 is a side sectional view of a tool for forming a cylindrical surface.
FIG. 23 is a top view of the tool represented in FIG. 22.

FIGS. 22 and 23 show a modified tool comprising, as the previously described tool modifications, the main housing 11 with a group of thread cutting chasers 14, and additional housing 12 with a group of chasers 13. Cutting blades at the chasers 13 and 14 have equal pitch. The profile of the blades has the form of a trapeze, whereas their inside diameter is equal to the pitch diameter of a corresponding triangular thread. The additional housing 12 accommodates inside the main housing 11. The relative axial position of these housings is permanently locked by a screw 38 so that the blades of one group of chasers are axially offset relative to the blades of the second group of chasers at a distance determined from the equation:

$$S = P(n + \tfrac{1}{2}),$$

where
S is the axial offset between the chaser blades;
P is the thread pitch; and
n is the number of thread turns necessary for self-tightening.

In operation of such a tool the first group of chasers from the thread to ensure tool feed by self-tightening. Since the trapezoidal blades of the two groups of chasers overlap the spaces between the thread turns when their axial sections are aligned, as well as due to the fact that crests or cutting edges of the second group of chasers with such an arrangement occupy one helical line with the thread roots of the first group of chasers, the second group of chasers will tend to remove the thread cut by the first group of chasers and form a smooth cylindrical surface. Lack of cut by such a tool will be determined by the number of thread turns necessary for self-tightening. The tool is withdrawn from the machined surface by rotating it in the opposite direction. Therewith, if the chasers of one group of chasers scratch the surface, the chasers of the second group tend to remove these scratchers. The danger of surface scratching is obviated, if the back rack angle of the chaser is negative.

An alternative modification of the proposed tool is possible, which prevents lack of surface cut. For this purpose the chasers must have a thread of one pitch but different number of starts.

The proposed tool for cutting external threads offers the following advantages:
  machining by equipment not provided with feed mechanisms, and by automatic machines by tool self-tightening;
  machining non-rigid workpieces deformable when machined by straight-turning cutting tools;
  improving the quality of the surface machined, since machining is done by a multi-blade tool;
  machining workpieces having curvilinear axes, since the tool is aligned according to the surface being machined;
  simplifying the adjustment of multistation automatic machines, because machining and thread cutting are carried out under the same cutting conditions; and
  lathing by a self-centering tool secured in a floating chuck.

A major advantage of the proposed thread cutting tool is the possibility for manual machining workpieces clamped in a vice. At present, no bench tools for lathe turning are available.

In view of the foregoing, all the structural modifications of the proposed thread cutting tool are characterized by simplicity and ease of manufacture. They can be made from pipe or sheet workpieces by stamping.

The provision for separately axially offsetting the thread chasers relative to the housing of the tool affords to optimize the thread cutting process. This is attained by dividing the different functions between the groups of chasers and optimizing the geometry of each group of chasers to perform their separate functions. More specifically, this principle of functional division is employed when some die chasers have cutting blades, while other chasers have thread calibrating blades.

A difference in the axial displacement of the groups of chasers makes it possible to control the degree of tool centering on a workpiece, whereas the provision of thread cutting blades at some of the chasers ensures thread cutting according to the generation scheme, thanks to that the threads of the cutting blades are full-profile variable-pitch.

The capacity of the end chasers to be offset radially relative to the cylindrical housing allows to accommodate the tool chasers at separate housings disposed one inside another, thereby providing unpreciedented thread cutting capabilities. This design principle is inherent in a tool capable of readjustment for making threads intended for different fits and working conditions, as well as in a tool for making a double-pitch thread with variable major diameter, and in a tool capable of readjustment to make threads with a wide range of pitch diameters.

New capabilities are also available for making use of the proposed thread cutting tool for forming non-threaded profiles by tool self-tightening, particularly for obtaining smooth cylindrical surfaces.

What is claimed is:

1. A tool for cutting external threads having the form of a round die, said tool comprising:
  a main housing in the form of an annulus having arcuate thread cutting chasers,
  a portion of said chasers being secured at an end face of said main housing,
  outer and inner surfaces of said portion coinciding with outer and inner cylindrical surfaces of said main housing,
  said thread cutting chasers having at least one end being offset toward a central axis of said die and extending a distance toward said axis equal to the height of the chaser, and
  at least one additional housing being arranged coaxially within said main housing and having an outer diameter substantially equal to the inside diameter of said housing, said additional housing having thread chasers interposed between the chasers of said main housing and having substantially the same pitch diameter as the chasers of the main housing.

2. A tool as defined in claim 1, wherein the main and additional housings are axially and angularly displaceable relative to each other.

3. A tool as defined in claim 1, wherein the main and additional housings are interconnected through a resilient element.

4. A tool as defined in claim 1, wherein the main and additional housings are axially displaceable with respect to each other, thread blades of the chasers of the main and additional housings having different pitch.

5. A tool as defined in claim 1, wherein at least two additional angular housings are insertable one inside the other and into the main housing and are rotatable relative to each other, the at least two additional housings being so arranged that an inner surface of each housing is eccentrical relative to an outer surface of the same housing, a number of thread chasers being equal to a number of housings, each of the housings having one thread chaser arranged so that the thread blades of all the chasers are disposed on one helical line.

6. A tool as defined in claim 1, wherein thread blades of the chasers of the main and additional housings are relatively offset in the axial direction by a distance:

$$S = P(n + \tfrac{1}{2})$$

wherein
- S is a magnitude of axial displacement;
- P is a thread pitch; and
- n is a number of thread turns necessary for self-tightening of the tool.

* * * * *